(12) United States Patent
Shiba et al.

(10) Patent No.: US 12,462,175 B2
(45) Date of Patent: Nov. 4, 2025

(54) HYBRID QUANTUM-CLASSICAL COMPUTER SYSTEM FOR QUANTUM AUTOENCODER-BASED PROCESSING

(71) Applicant: GRID INC., Tokyo (JP)

(72) Inventors: Kodai Shiba, Tokyo (JP); Masaru Sogabe, Tokyo (JP)

(73) Assignee: GRID INC., Tokyo (JP)

( * ) Notice: Subject to any disclaimer, the term of this patent is extended or adjusted under 35 U.S.C. 154(b) by 1067 days.

(21) Appl. No.: 17/600,883

(22) PCT Filed: Apr. 1, 2020

(86) PCT No.: PCT/JP2020/015076
§ 371 (c)(1),
(2) Date: Oct. 1, 2021

(87) PCT Pub. No.: WO2020/204093
PCT Pub. Date: Oct. 8, 2020

(65) Prior Publication Data
US 2022/0180239 A1    Jun. 9, 2022

Related U.S. Application Data

(60) Provisional application No. 62/828,212, filed on Apr. 2, 2019.

(51) Int. Cl.
*G06N 10/40* (2022.01)
*G06N 10/20* (2022.01)
*G06N 10/60* (2022.01)

(52) U.S. Cl.
CPC ............. *G06N 10/40* (2022.01); *G06N 10/20* (2022.01); *G06N 10/60* (2022.01)

(58) Field of Classification Search
None
See application file for complete search history.

(56) References Cited

U.S. PATENT DOCUMENTS

2020/0005186 A1*  1/2020  Romero ................. G06N 10/60

OTHER PUBLICATIONS

Romero et al., Quantum autoencoders for efficient compression of quantum data; ResearchGate; Article in Quantum Science and Technology; Aug. 2017; Total pp. 11 (Year: 2017).*

(Continued)

*Primary Examiner* — Alan Chen
(74) *Attorney, Agent, or Firm* — Calyx Law LLP; Frank L. Gerratana; James Richard

(57) ABSTRACT

A computer system is configured to extend processing executable by a quantum computer in a hybrid system of a classical computer and the quantum computer. The classical computer includes an extraction unit, a generation unit, and a synthesis unit, and the quantum computer includes a control unit and a quantum unit, where the extraction unit extracts a plurality of first element groups as a set of first elements, the generation unit generates parameters based on a first element contained in a corresponding first element group, the control unit controls the quantum unit to cause the quantum unit to execute a quantum computation algorithm on each of the plurality of first element groups based on the parameters and corresponding feature data, and the synthesis unit synthesizes the execution results of the quantum computation algorithm by the quantum unit for each of the plurality of first element groups.

6 Claims, 16 Drawing Sheets

(56) References Cited

OTHER PUBLICATIONS

International Search Report issued Jul. 7, 2020 in corresponding PCT Application No. PCT/JP2020/015076.
E. Farhi et al., "Quantum Computation by Adiabatic Evolution," arXiv preprint quant-ph/0001106 (Jan. 28, 2000), pp. 1-24.
J. Preskill, "Quantum Computing in the NISQ era and beyond," Quantum 2 (Aug. 16, 2018), pp. 1-20.

* cited by examiner

HYBRID QUANTUM-CLASSICAL COMPUTER SYSTEM FOR QUANTUM AUTOENCODER-BASED PROCESSING

CROSS-REFERENCE TO RELATED APPLICATION

This application is a U.S. National Phase of International Application No. PCT/JP2020/015076 with an International Filing Date of Apr. 1, 2020, which claims under 35 U.S.C. § 119(e) the benefit of U.S. provisional Patent Application Ser. No. 62/828,212, filed Apr. 2, 2019, the entire contents of which are incorporated herein by reference.

TECHNICAL FIELD

The present invention relates to a computer system, an information processing method, a program, and an information processing device.

BACKGROUND ART

In recent years, the research of quantum computers doing calculations utilizing the quantum mechanical nature of matter has been conducted. A quantum gate type quantum computer can build a quantum circuit by combining quantum gates depending on the problem to be solved, which is a highly versatile quantum computer. Therefore, the quantum gate type quantum computer is expected to be put into practical use in several decades.

However, qubits used by the quantum gate type quantum computer are very vulnerable to external interference, and it is difficult to maintain the quantum state of the qubits for a long time. The more the number of qubits, the easier it is to include noise. Further, an error correction function cannot be implemented yet. Therefore, an NISQ computer (Noisy Intermediate-Scale Quantum computer) without an error correction function and with the number of qubits limited is being developed at present (see Non-Patent Document 1).

CITATION LIST

Non-Patent Document

Non-Patent Document 1: J. Preskill, "Quantum computing in the NISQ era and beyond," arXiv: 1801.00862, 2018.

SUMMARY

Technical Problem

When using the NISQ, a hybrid system in which a quantum computer and a classical computer are combined is utilized. However, many processes in the hybrid system are performed by the classical computer, and processes executed by the quantum computer are limited. Therefore, technology to expand the range of processes executable by the quantum computer has been sought.

Therefore, it is an object of the present invention to provide a computer system, an information processing method, a program, and an information processing device for extending processing executable by a quantum computer in a hybrid system of a classical computer and the quantum computer.

Solution to Problem

A computer system according to one aspect of the present invention is a computer system including a classical computer capable of executing a classical program and a quantum computer capable of executing a quantum program, wherein the classical computer includes a generation unit and an update unit, the quantum computer includes a control unit and a quantum unit, the generation unit generates parameters based on input data obtained by mapping a plurality of elements associated with element values, respectively, the control unit controls the quantum unit to cause the quantum unit to execute a quantum computation algorithm based on the parameters and feature data of the input data, and the update unit compares the input data and the execution results of the quantum computation algorithm by the quantum unit and updates the feature data based on the comparison results.

A computer system according to another aspect of the present invention is a computer system including a classical computer capable of executing a classical program and a quantum computer capable of executing a quantum program, wherein the classical computer includes an extraction unit, a generation unit, and a synthesis unit, the quantum computer includes a control unit and a quantum unit, the extraction unit extracts a plurality of first element groups as a set of first elements from input data obtained by mapping a plurality of first elements associated with element values, respectively, the generation unit generates, for each of the plurality of first element groups, parameters based on a first element contained in a corresponding first element group, the control unit controls the quantum unit to cause the quantum unit to execute a quantum computation algorithm on each of the plurality of first element groups based on the parameters and corresponding feature data, and the synthesis unit synthesizes the execution results of the quantum computation algorithm by the quantum unit for each of the plurality of first element groups.

An information processing device according to still another aspect of the present invention includes: a generation unit which generates parameters based on input data obtained by mapping a plurality of elements associated with element values, respectively; a control unit which controls a quantum computer to cause the quantum computer to execute a quantum computation algorithm based on the parameters and feature data of the input data; and an update unit which updates the feature data based on the input data and the execution results of the quantum computation algorithm by the quantum computer.

An information processing device according to yet another aspect of the present invention includes: an extraction unit which extracts a plurality of first element groups as a set of first elements from input data obtained by mapping a plurality of first elements associated with element values, respectively; a generation unit which generates, for each of the plurality of first element groups, parameters based on a first element contained in a corresponding first element group; a control unit which controls a quantum computer to cause the quantum computer to execute a quantum computation algorithm on each of the plurality of first element groups based on the parameters and corresponding feature data; and a synthesis unit which synthesizes the execution results of the quantum computation algorithm by the quantum computer for each of the plurality of first element groups.

Advantageous Effects of Invention

According to the present invention, there can be provided a computer system, an information processing method, a program, and an information processing device for extending processing executable by a quantum computer in a hybrid system of a classical computer and the quantum computer.

DESCRIPTION OF EMBODIMENTS

Preferred embodiments of the present invention will be described with reference to the accompanying drawings.

First Embodiment

Figure 1:
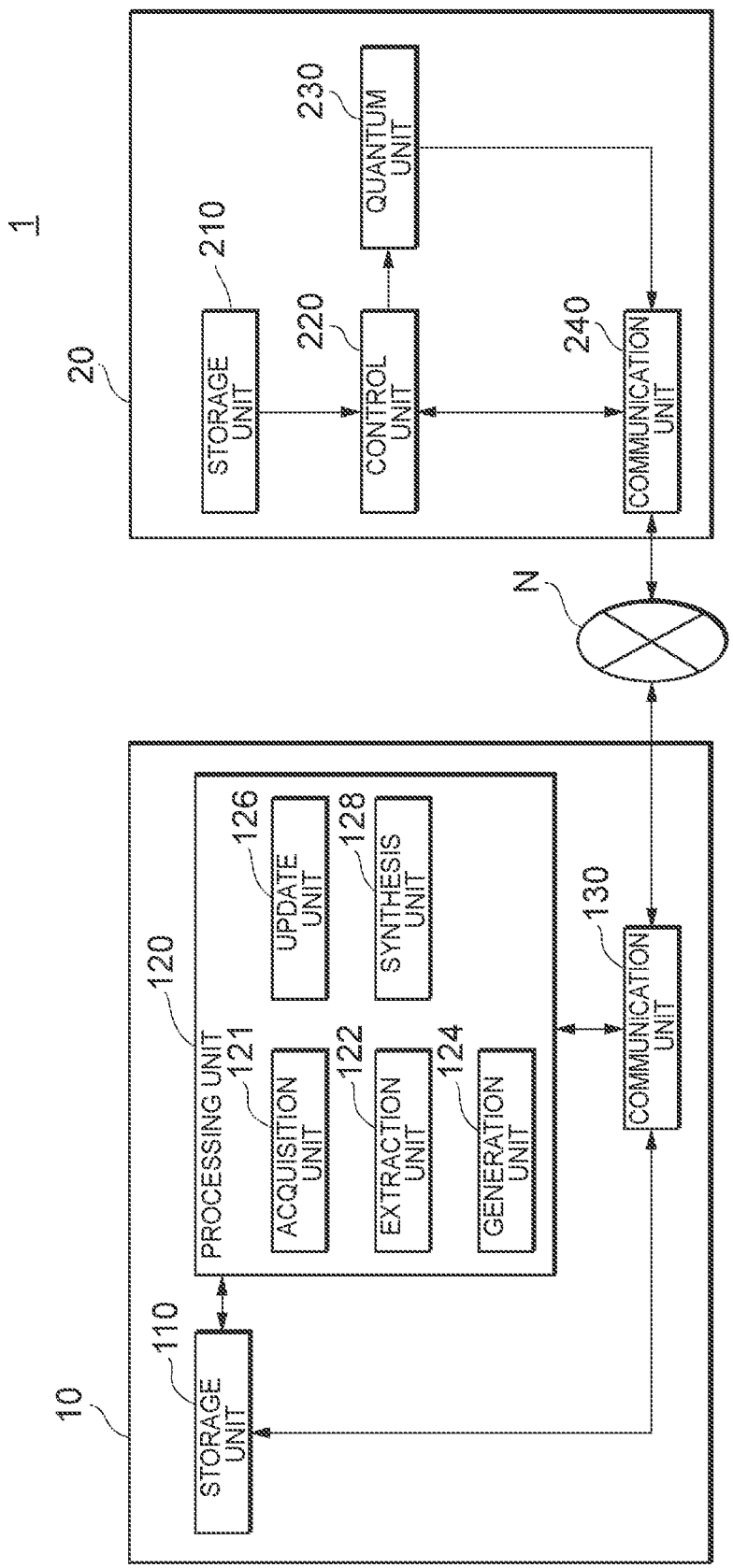
FIG. 1 is a diagram illustrating a configuration example of a computer system according to one embodiment of the present invention.

FIG. 1 is a diagram illustrating a configuration example of a computer system 1 according to one embodiment of the present invention. The computer system 1 according to the present embodiment includes a classical computer 10 and a quantum computer 20. Thus, the computer system 1 is configured as a hybrid system having a classical computer function and a quantum computer function.

The classical computer 10 and the quantum computer 20 are connected to be communicable through a communication network N. The communication network N is a wired or wireless communication network, which may be, for example, the Internet, or LAN (Local Area Network) or the like.

The classical computer 10 executes a classical program to perform various information processing. The classical program is code representing an algorithm executable by the classical computer. The classical program is a program written in a programming language such as C language. The classical computer 10 includes a storage unit 110, a processing unit 120, and a communication unit 130.

The storage unit 110 stores various information. Specifically, the storage unit 110 stores the classical program executed by the processing unit 120 to perform various processing, information to be processed by the processing unit 120, and information such as the results of processing by the processing unit 120 and data generated by the quantum computer 20. For example, the storage unit 110 stores image data processed by the processing unit 120, and information such as parameters generated by the processing unit 120. The various information stored in the storage unit 110 is referred to by the processing unit 120 as necessary.

The processing unit 120 has a function to perform various information processing. Further, the processing unit 120 can store the results of processing in the storage unit 110. The processing unit 120 includes an acquisition unit 121, an extraction unit 122, a generation unit 124, an update unit 126, and a synthesis unit 128.

The acquisition unit 121 has a function to acquire various information. For example, the acquisition unit 121 can acquire image data from the storage unit 110.

The extraction unit 122 has a function to extract information from various data. For example, the extraction unit 122 can extract, from image data, a pixel group (element group) as a set of pixels (elements) that constitute at least part of the image data.

The generation unit 124 can generate various parameters. In the present embodiment, the generation unit 124 can generate parameters based on image data or information extracted from the image data. For example, the generation unit 124 can generate parameters based on input data obtained by mapping multiple elements, each of which is associated with an element value, respectively. In the present embodiment, the input data is image data obtained by mapping pixel values into a two-dimensional grid pattern. Based on the image data, the generation unit 124 can generate parameters such as a longitudinal magnetic field coefficient and a coupling coefficient used in a quantum computation algorithm to be described later.

The update unit 126 can update various parameters. For example, the update unit 126 can update any parameter such as the coupling coefficient based on the execution result of the quantum computation algorithm by the quantum computer 20. Specifically, the update unit 126 can compare the input data with the execution result of the quantum computation algorithm to update feature data corresponding to the input data based on the comparison result.

The synthesis unit 128 can synthesize various information. Specifically, the synthesis unit 128 can synthesize the execution results of the quantum computation algorithm by the quantum computer 20. More specifically, the synthesis unit 128 can generate a synthesized image obtained by synthesizing multiple pixel groups as the execution results of the quantum computation algorithm.

The communication unit 130 can send and receive various information. For example, the communication unit 130 can send the quantum computer 20 parameters generated by the generation unit 124, parameters updated by the update unit 126, and the like. Further, the communication unit 130 can receive the execution results of the quantum computation algorithm by the quantum computer 20. Further, the communication unit 130 can store received information in the storage unit 110.

The quantum computer 20 is a computer that perform calculations utilizing the quantum mechanical nature of matter, which may be a quantum computer of a quantum gate type. The quantum computer 20 may be configured by any hardware.

The quantum computer 20 can execute the quantum computation algorithm based on a quantum program. The quantum program is code representing various quantum algorithms. The quantum program may be, for example, represented as a quantum circuit. Note that, like the classical program, the quantum program may also include a program written in a programming language.

The quantum computer 20 includes a storage unit 210, a control unit 220, a quantum unit 230, and a communication unit 240. Here, the storage unit 210, the control unit 220, and the communication unit 240 may also include classical computer functions.

The storage unit 210 stores various information. For example, the storage unit 210 stores the quantum program used by the quantum unit 230 to execute the quantum computation algorithm. The various information stored in the storage unit 210 is referred to by the control unit 220 as necessary.

The control unit 220 can control the quantum unit 230 based on the quantum program. Specifically, the control unit 220 can cause the quantum unit 230 to execute the quantum computation algorithm based on feature data corresponding to the parameters generated by the generation unit 124 and input data.

The quantum unit 230 is a core unit of the quantum computer 20, which can execute the quantum computation algorithm under the control of the control unit 220. In the present embodiment, the quantum unit 230 executes an adiabatic quantum computation algorithm. The adiabatic quantum computation algorithm is known as one of optimization algorithms. In the following, the adiabatic quantum computation algorithm may also be simply called "adiabatic quantum computation."

The adiabatic quantum computation is known as one of annealing calculation methods calculated using an ising model (see reference 1). The ising model is a model that models the operation of spins in magnets such as a ferromagnet and an antiferromagnet. Each of the spins takes one of two states: up-spin (+1) or down-spin (−1).

(Reference 1) E. Farhi, J. Goldstone, S. Gutmann, and M. Sipser, "Quantum Computation by Adiabatic Evolution," quant-ph/0001106, 2000.

The whole system of the Hamiltonian in the ising model is expressed by Equation (1) below using a coupling coefficient $J_{ij}$ between two spins $s_i$ and $s_j$, and a local longitudinal magnetic field $h_{zi}$ applied to inside of spin $s_i$.

[Math 1]
$$H = \sum_{i<j} J_{ij} s_i s_j + \sum_i h_{z_i} s_i \quad (1)$$

In the adiabatic quantum computation, a transverse magnetic field coefficient hx is added to set the initial state of the Hamiltonian. Further, since the spin si corresponds to a Pauli operator $\sigma_i^z$, it can be expressed by a phase-inversion computing gate Zi as a quantum gate represented in a matrix. Further, a parameter s(=t/tf) with time t standardized by tf is introduced to set $0 \leq s \leq 1$. Thus, the Hamiltonian in the adiabatic quantum computation is expressed by Equation (2) below.

[Math 2]
$$H(s) = s\left[\sum_{i<j} W_{ij}(\theta) Z_i Z_j + \sum_i h_{z_i}(\theta) Z_i\right] + (1-s) \sum_i h_x(\theta) X_i \quad (2)$$

Wij, hzi, and hx are phase parameters for a unitary rotation gate in the quantum circuit. Therefore, these parameters are represented as Wij(θ), hzi(θ), and hx(θ). In the quantum computer, unitary transformation can be performed in order to represent the time evolution of the Schrödinger equation. When the state vector of a qubit is denoted by |ψ⟩, the Schrödinger equation is expressed by Equation (3) below.

[Math 3]
$$i\hbar \frac{\partial}{\partial t} |\psi\rangle = H|\psi\rangle \quad (3)$$

When the Schrödinger equation in a case where the state vector is dependent on time and the Hamiltonian is independent of time is solved, it can be transformed as Equations (4) and (5) below to derive unitary transformation U(t).

[Math 4]
$$|\psi(t)\rangle = e^{-i\frac{H}{\hbar}t}|\psi(0)\rangle \quad (4)$$

[Math 5]
$$U(t) = e^{-i\frac{H}{\hbar}t} \quad (5)$$

The minimum value of the Hamiltonian can be determined by assigning Equation (2) to H in Equation (5) and repeating the unitary transformation U(t) to obtain the optimum spin state. The outline of the adiabatic quantum computation performed by the quantum unit 230 is described above.

The communication unit 240 has a function to send and receive various information. For example, the communication unit 240 sends the classical computer 10 the execution results of the adiabatic quantum computation algorithm by the quantum unit 230.

The outline of the functionality of the computer system 1 according to the present embodiment is described above. Processing performed by the computer system 1 will be described in more detail with reference to FIG. 2 to FIG. 5.

Figure 2:
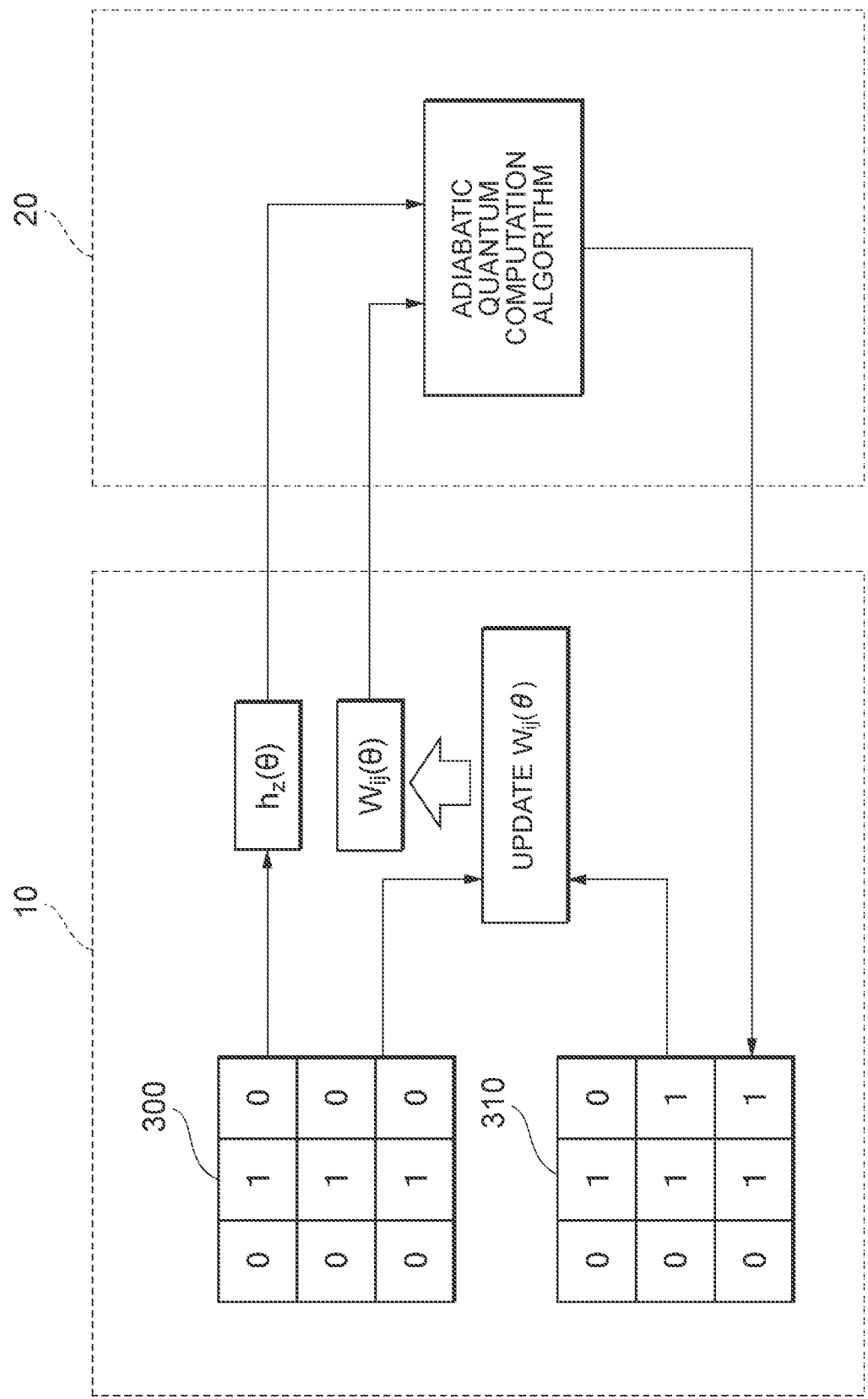
FIG. 2 is a diagram illustrating the outline of processing by the computer system according to the present embodiment.

FIG. 2 is a diagram illustrating the outline of processing by the computer system 1 according to the present embodiment. Here, the computer system 1 is described on the assumption that image data having a size of 3×3 pixels (=9 pixels) is set as input data 300 to learn parameters used in order to restore the input data 300. The input data 300 is such that a pixel value of 0 or 1 is associated with each of the nine pixels, respectively. Here, it is assumed that the pixel value of 0 corresponds to white, and the pixel value of 1 corresponds to black.

The classical computer 10 can generate a longitudinal magnetic field coefficient hz(θ) based on the input data 300. Specifically, the classical computer 10 can generate a longitudinal magnetic field coefficient hz(θ) according to the pixel value corresponding to each of the nine pixels included in the input data 300. The classical computer 10 can also generate a coupling coefficient Wij(θ). Here, it is assumed that the classical computer 10 generates a random value as the coupling coefficient Wij(θ). Note that the longitudinal magnetic field coefficient hz(θ) and the coupling coefficient Wij(θ) can be generated by the generation unit 124 included in the classical computer 10.

The quantum computer 20 uses the longitudinal magnetic field coefficient hz(θ) and the coupling coefficient Wij(θ) generated by the classical computer 10 to execute the adiabatic quantum computation algorithm. In other words, the quantum computer 20 executes the adiabatic quantum computation described with reference to Equations (1) to (5). At this time, the transverse magnetic field coefficient hx(θ) may be a pre-specified, predetermined value.

It is assumed that each of the pixels contained in the input data 300 corresponds to each of qubits. Further, it is assumed that each of the qubits corresponds to a spin of the ising model.

Figure 3:
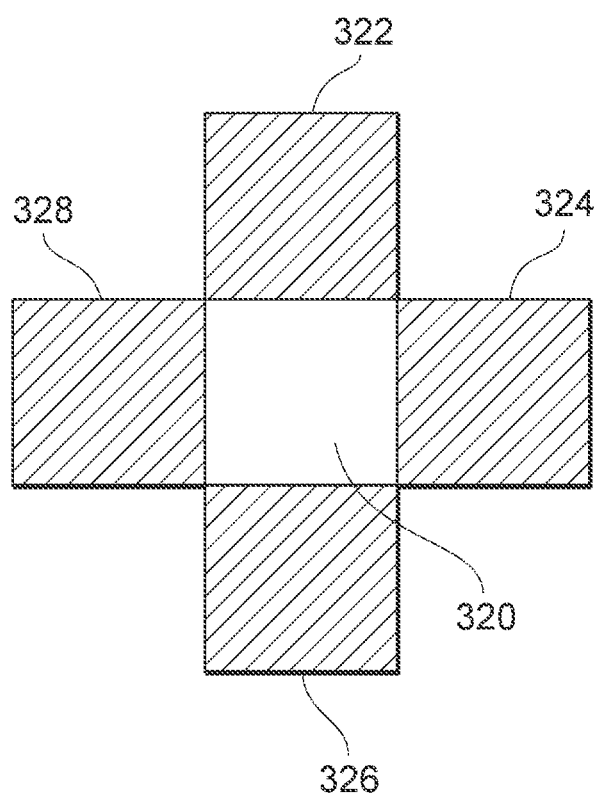
FIG. 3 is a diagram for describing coupling of spins corresponding to respective pixels.

FIG. 3 is a diagram for describing coupling of spins corresponding to respective pixels. In the present embodiment, each pixel is considered to be coupled only with four spins (pixels) adjacent to the up, down, left and right sides of the pixel. For example, it is assumed that pixel 320 illustrated at the center of FIG. 3 is coupled only with four adjacent pixels 322, 324, 326, and 328. At this time, a coupling coefficient of the pixel 320 at the center and the pixel 322 above the pixel 320 is represented as Wi−1,j(θ), a coupling coefficient of the pixel 320 at the center and the pixel 324 to the right of the pixel 320 is represented as Wi,j+1(θ), a coupling coefficient of pixel 320 at the center and the pixel 326 below the pixel 320 is represented as Wi+1,j(θ), and a coupling coefficient of the pixel 320 at the center and the pixel 328 to the left of the pixel 320 is represented as Wi,j−1(θ). These coupling coefficients represent relationships of two coupled pixels, respectively. Here, it is also assumed that periodic boundary conditions are applied.

Figure 4:
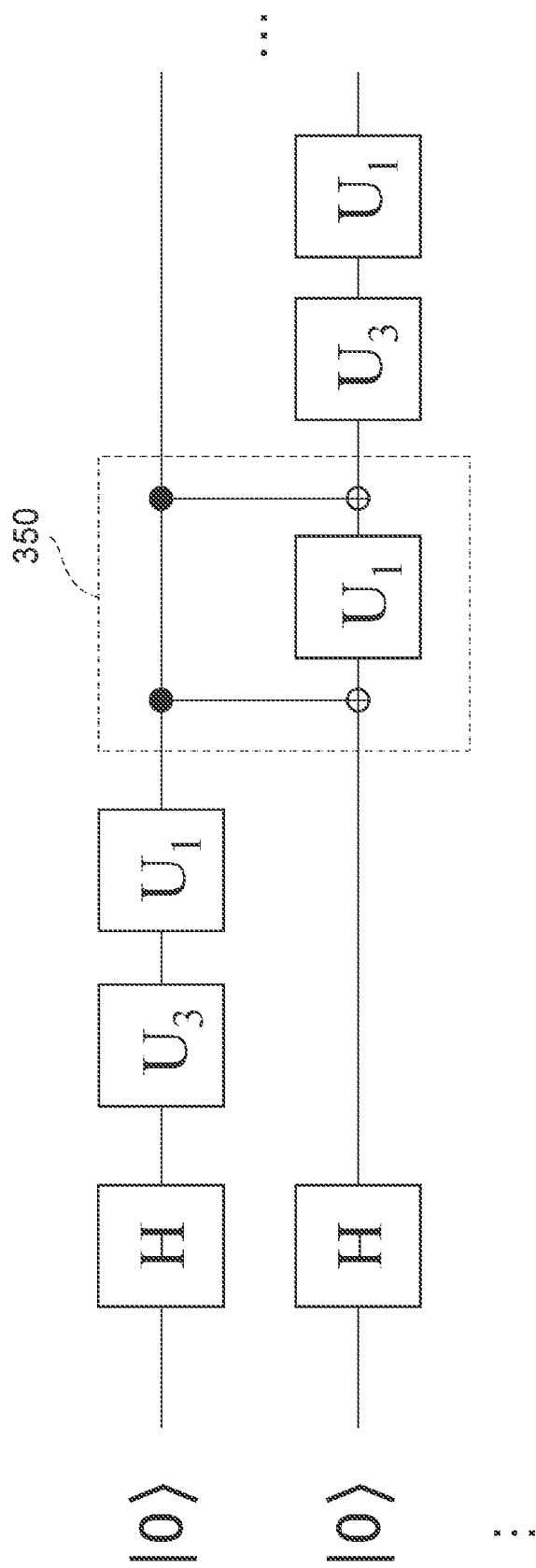
FIG. 4 is a diagram illustrating part of a quantum circuit diagram used for adiabatic quantum computation according to the present embodiment.

FIG. 4 is a diagram illustrating part of a quantum circuit diagram used for adiabatic quantum computation according to the present embodiment. H illustrated in FIG. 4 is a Hadamard gate. Further, a unitary gate U3 corresponds to Xi in the Hamiltonian. Further, a unitary gate U1 corresponds to Zi in the Hamiltonian. Further, a quantum circuit 350 surrounded by the dashed line corresponds to ZiZj in the Hamiltonian.

Returning to FIG. 2, after performing the adiabatic quantum computation, the quantum computer 20 sends the classical computer 10 image data of 3×3 pixels as output data 310. The classical computer 10 updates the coupling coefficient Wij(θ) based on the input data 300 and the output data 310. Specifically, the classical computer 10 updates the coupling coefficient Wij(θ) using Equations (6) and (7) below.

$$Wij(\theta) = Wij(\theta) + \varepsilon Eij \quad (6)$$

$$Eij = (ZiZj)\text{original} - ZiZj \quad (7)$$

Here, Eij is a difference between a product sisj of two spins corresponding to the input data 300 and a product sisj of two spins contained in the output data 310. Further, ε is a learning rate. Wij(θ) is learned (optimized) by repeating the adiabatic quantum computation by the quantum computer 20 and updating of Wij(θ) by the classical computer 10.

Figure 5:
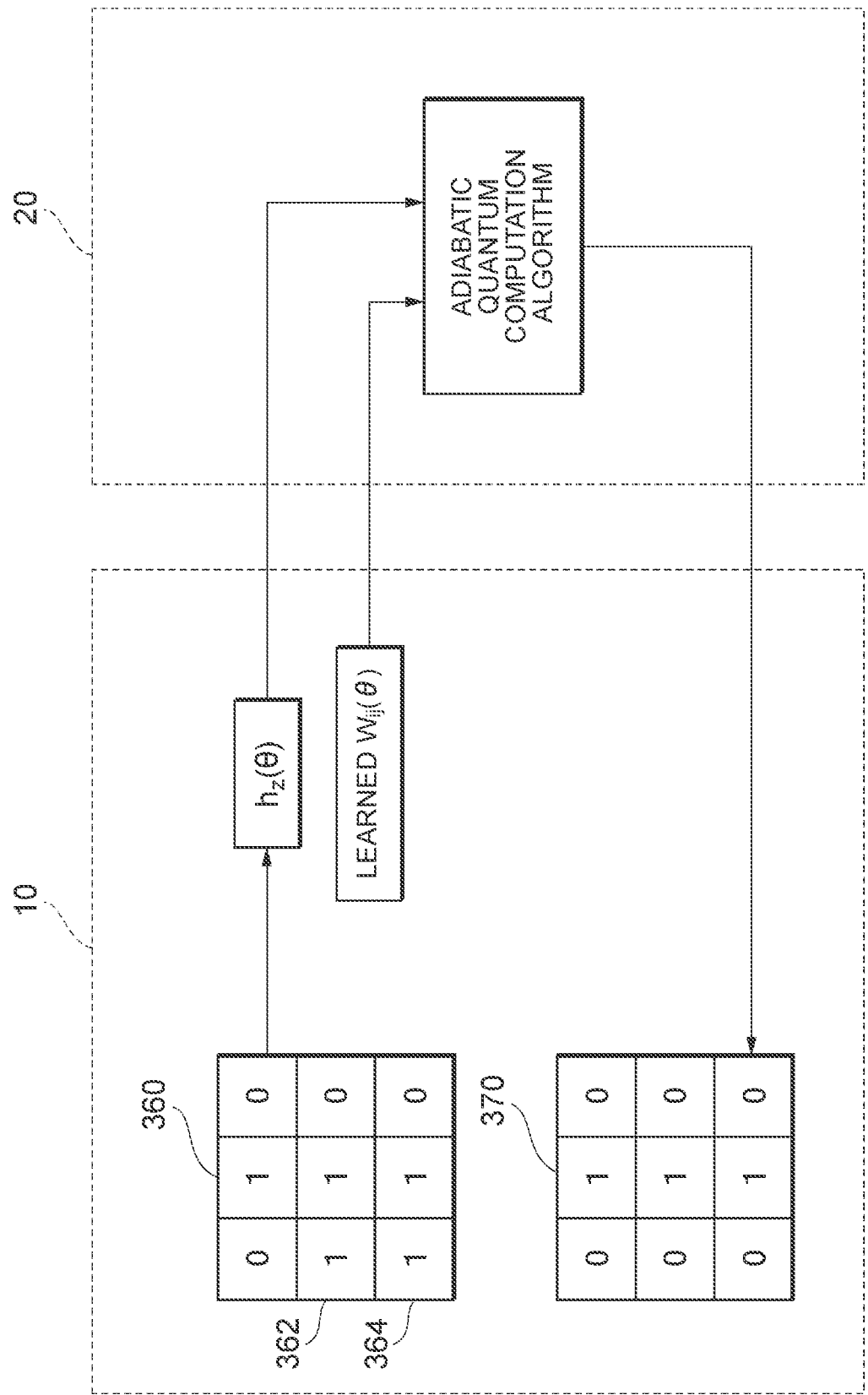
FIG. 5 is a diagram for describing processing by the computer system to remove noise added to input data 360 using a learned Wij(θ).

FIG. 5 is a diagram for describing processing by the computer system 1 to remove noise added to input data 360 using the learned Wij(θ). Here, the input data 360 is data obtained by adding noise to the input data 300 illustrated in FIG. 2.

The classical computer 10 sends the quantum computer 20 the longitudinal magnetic field coefficient hz(θ) based on the input data 360, and the learned Wij(θ) described with reference to FIG. 2. The quantum computer 20 performs adiabatic quantum computation using hz(θ) and Wij(θ), and outputs image data of 3×3 pixels as output data 370. Thus, noise contained in the input data 360 is removed.

Note that use of the learned coupling coefficient Wij(θ) is described here, but the present invention is not limited thereto. The coupling coefficient Wij(θ) may also be set based on a predetermined condition. For example, when feature data of the input data 300 is the coupling coefficient Wij(θ) and two spins si, sj are in the same orientation, i.e., when two squares are the same color (white and white, or black and black), the coupling coefficient may be set as Wij(θ)=−1, while when two spins are in different orientations, the coupling coefficient may be set as Wij(θ)=1.

Figure 6:
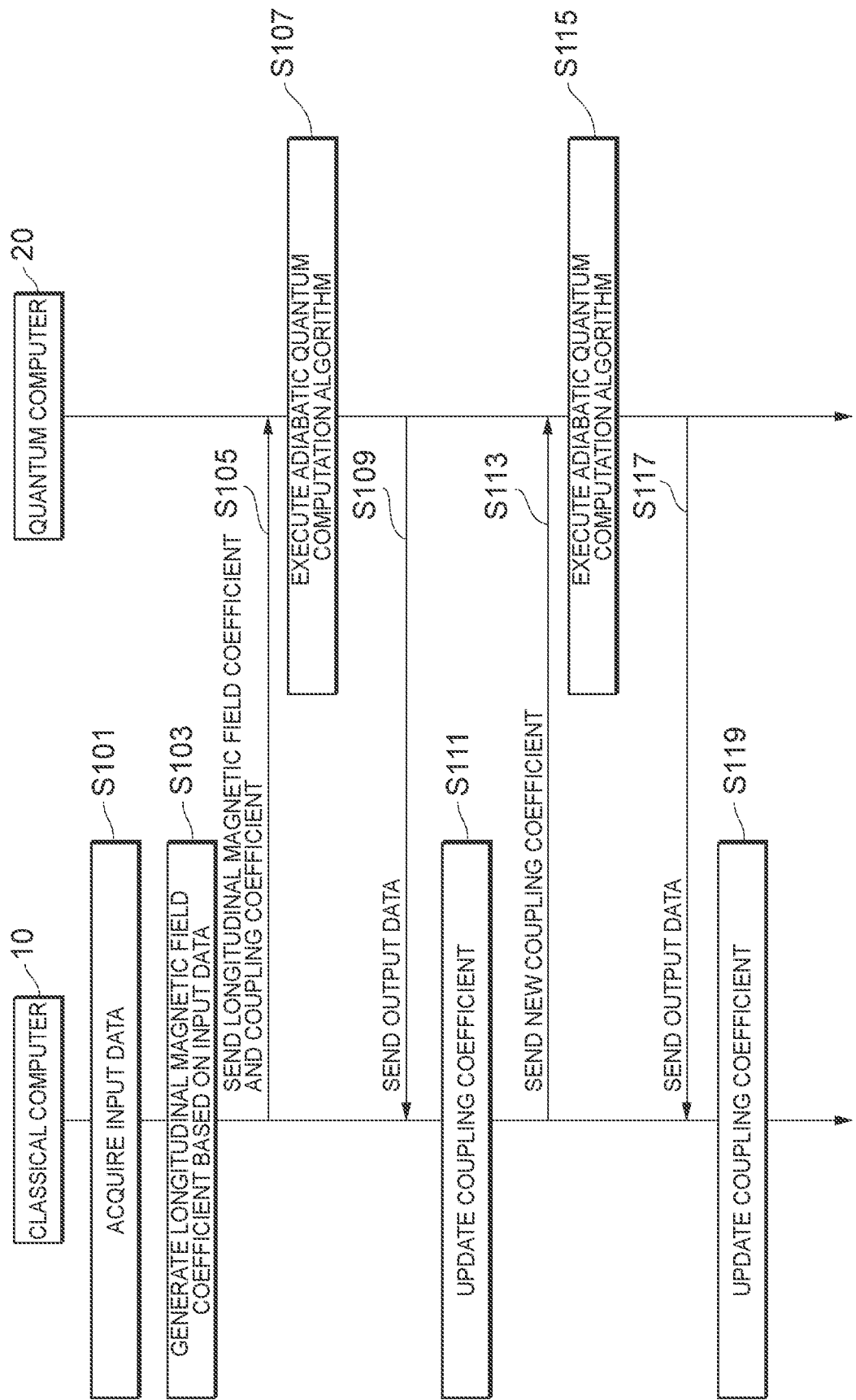
FIG. 6 is a flowchart illustrating an example of a flow in which the computer system performs adiabatic quantum computation using parameters based on input data to update a coupling coefficient Wij(θ) according to the result of the adiabatic quantum computation.
Figure 7:
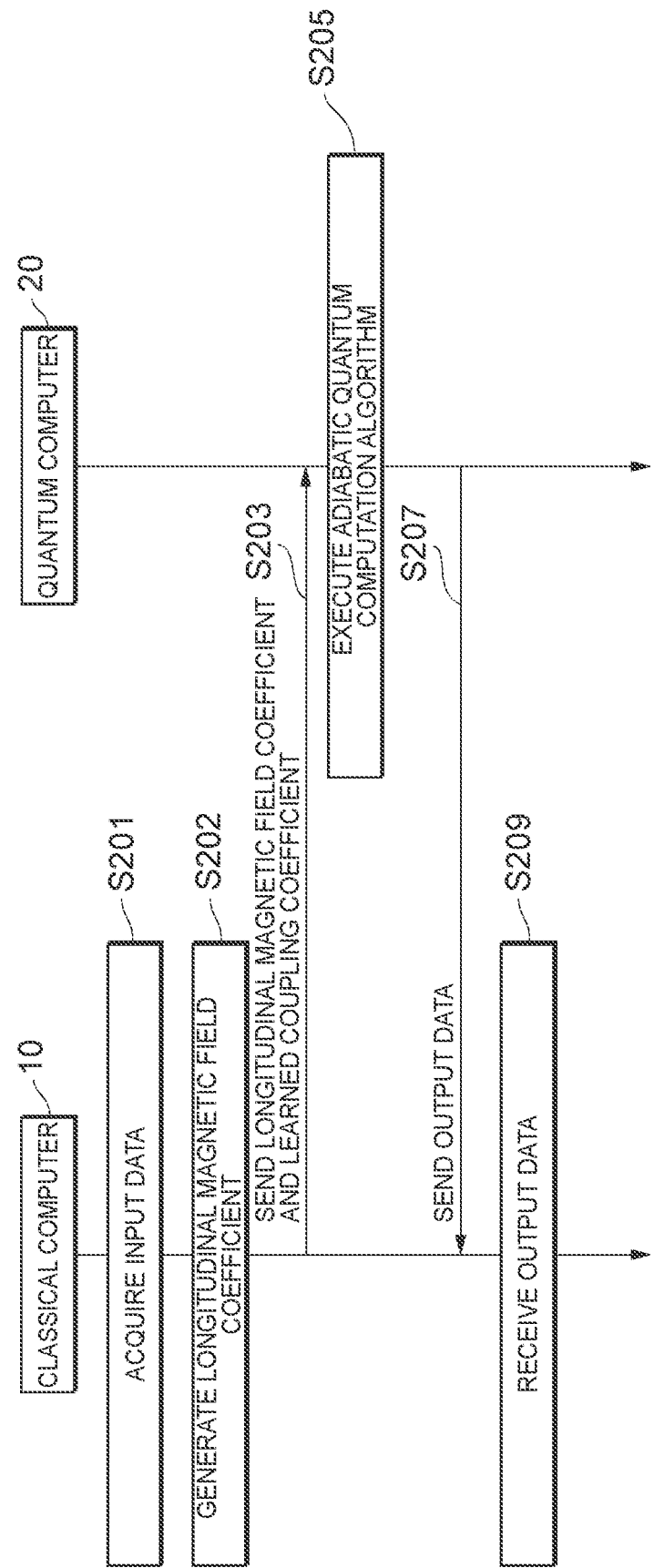
FIG. 7 is a flowchart illustrating a flow of processing by the computer system 1 to remove noise from input data using a learned coupling coefficient Wij(θ).

Referring next to FIG. 6 and FIG. 7, a flow of processing by the computer system 1 will be described. FIG. 6 is a flowchart illustrating an example of a flow in which the computer system 1 performs adiabatic quantum computation using parameters based on input data to update the coupling coefficient Wij(θ) according to the results of the adiabatic quantum computation. Further, FIG. 7 is a flowchart illustrating a flow of processing by the computer system 1 to remove noise from input data using the learned coupling coefficient Wij(θ).

Referring to FIG. 6, the processing of the computer system 1 will be described.

First, the acquisition unit 121 included in the classical computer 10 acquires image data as input data from the storage unit 110 (step S101). Specifically, the acquisition unit 121 acquires image data of 3×3 pixels as input data.

Next, the generation unit 124 generates a longitudinal magnetic field coefficient hz(θ) based on the input data acquired in step S101 (step S103). At this time, the generation unit 124 further generates a coupling coefficient Wij(θ) as a random value.

Next, the communication unit 130 sends the quantum computer 20 the longitudinal magnetic field coefficient hz(θ) and the coupling coefficient Wij(θ) generated in step S103 (step S105). The communication unit 240 included in the quantum computer 20 receives the longitudinal magnetic field coefficient hz(θ) and the coupling coefficient Wij(θ) sent to the quantum computer 20, and transfers the received coefficients to the control unit 220.

Based on the longitudinal magnetic field coefficient hz(θ) and the coupling coefficient Wij(θ) sent in step S105, the control unit 220 causes the quantum unit 230 to execute the adiabatic quantum computation algorithm (step S107). At this time, the quantum unit 230 observes respective values of qubits, and transfers the observation results to the communication unit 240 as output data. Each of observed values corresponds to each pixel included in the image data of 3×3 pixels.

Next, the communication unit 240 sends the output data to the communication unit 130 of the classical computer 10 (step S109). The communication unit 130 of the classical computer 10 receives and transfers the output data to the update unit 126.

Next, the update unit 126 updates the coupling coefficient $Wij(\theta)$ (step S111). Specifically, the update unit 126 compares the input data with the output data sent in step S109, and updates the coupling coefficient $Wij(\theta)$ based on the comparison result. Specifically, the update unit 126 updates the coupling coefficient $Wij(\theta)$ using Equations (6) and (7) described above.

The communication unit 130 sends a new coupling coefficient $Wij(\theta)$ updated in step S111 to the communication unit 240 included in the quantum computer 20 (step S113). The communication unit 240 receives and transfers the new coupling coefficient $Wij(\theta)$ to the control unit 220.

Based on the longitudinal magnetic field coefficient $hz(\theta)$ and the new coupling coefficient $Wij(\theta)$, the control unit 220 causes the quantum unit 230 to execute the adiabatic quantum computation algorithm (step S115). The execution result of the adiabatic quantum computation algorithm (that is, output data as the observation results of qubits) are transferred to the communication unit 240.

The communication unit 240 sends, as output data, the execution result of the adiabatic quantum computation algorithm acquired in step S115 to the communication unit 130 of the classical computer 10 (step S117). The communication unit 130 receives and transfers the output data to the update unit 126.

Next, the update unit 126 updates the coupling coefficient $Wij(\theta)$ in the same manner as the process in step S111 (step S119). In the following, the processes in step S113 to step S119 are repeatedly performed to generate a learned coupling coefficient $Wij(\theta)$. The learned coupling coefficient $Wij(\theta)$ may be stored in the storage unit 110.

Referring to FIG. 7, processing for removing noise from input data by the computer system 1 using the learned coupling coefficient $Wij(\theta)$ generated in the processing illustrated in FIG. 6 will be described.

First, the acquisition unit 121 included in the classical computer 10 acquires input data from the storage unit 110 (step S201). Here, it is assumed that noise described with reference to FIG. 5 is contained in the input data.

Next, the generation unit 124 generates a longitudinal magnetic field coefficient $hz(\theta)$ according to the input data acquired in step S201 (step S202). Therefore, the longitudinal magnetic field coefficient $hz(\theta)$ generated here is affected by noise.

Next, the communication unit 130 sends the quantum computer 20 the longitudinal magnetic field coefficient $hz(\theta)$ generated in step S202 and the learned coupling coefficient $Wij(\theta)$ (step S203). The communication unit 240 of the quantum computer 20 receives and transfers the longitudinal magnetic field coefficient $hz(\theta)$ and the learned coupling coefficient $Wij(\theta)$ to the control unit 220.

Next, the control unit 220 causes the quantum unit 230 to execute the adiabatic quantum computation algorithm based on the longitudinal magnetic field coefficient $hz(\theta)$ and the learned coupling coefficient $Wij(\theta)$ sent in step S203 (step S205). The execution result of the adiabatic quantum computation algorithm is transferred to the communication unit 240 as output data. Here, the output data is image data of 3×3 pixels.

Next, the communication unit 240 sends the classical computer 10 the output data (step S207). Next, the communication unit 130 of the classical computer 10 receives the output data (step S209). Thus, the classical computer 10 can acquire the output data with noise removed from the input data.

Figure 8:
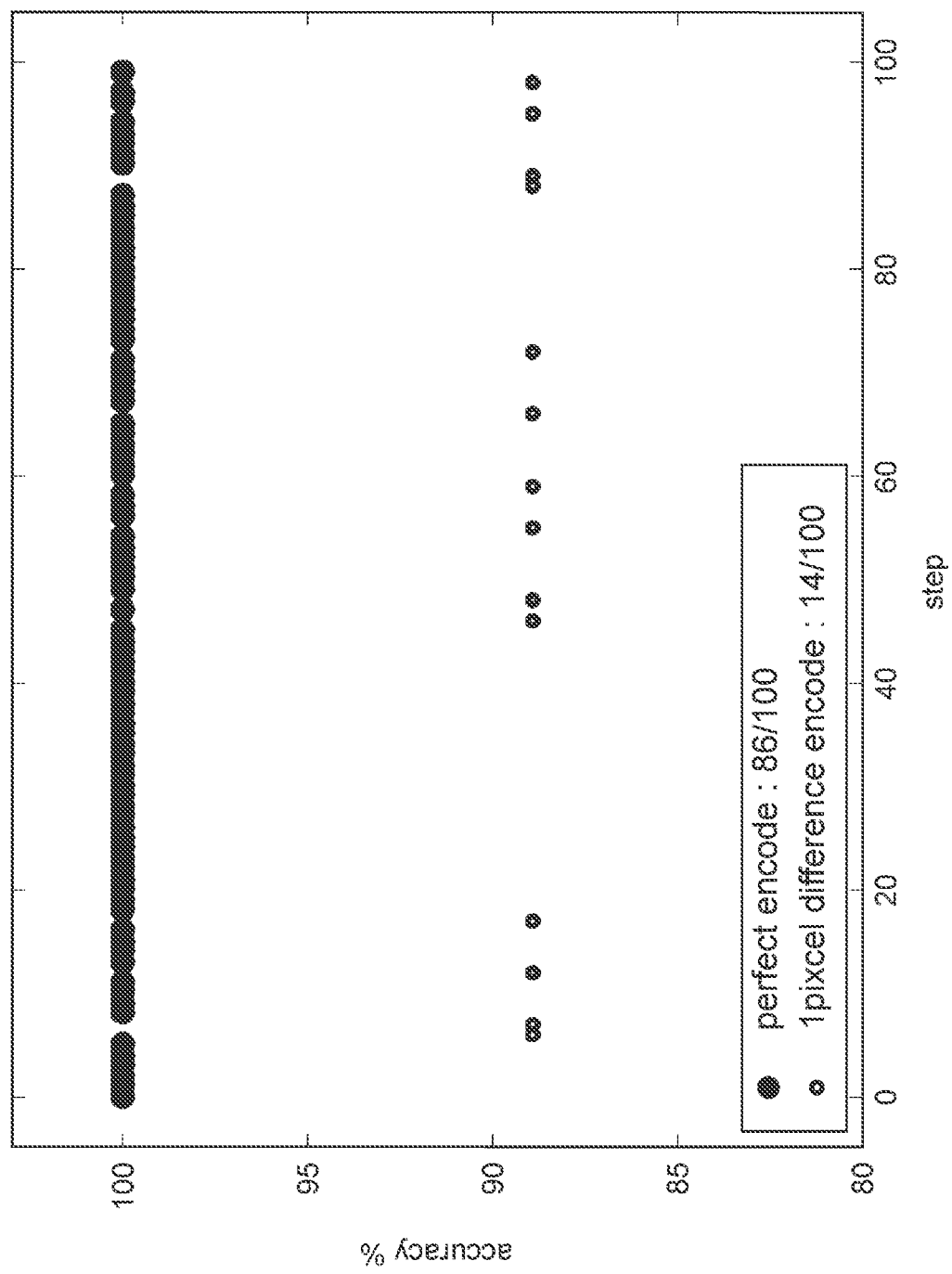
FIG. 8 is a chart illustrating the results of performing the processing illustrated in FIG. 6 and FIG. 7 100 times using a quantum simulator by the classical computer.

The results of performing the processing illustrated in FIG. 6 and FIG. 7 100 times using a quantum simulator by the classical computer are illustrated in FIG. 8. As illustrated in FIG. 8, among 100 times of the processing, the same output data as the input data was able to be obtained 86 times. Note that output data with only 1 pixel wrong was obtained 14 times.

The computer system 1 according to the present embodiment is described above. According to the computer system 1 of the present embodiment, processing similar to that of an autoencoder in machine learning can be carried out. Specifically, the computer system 1 can restore image data or remove noise contained in the image data. Therefore, the computer system 1 according to the present embodiment functions as a so-called quantum autoencoder. According to the present embodiment, the computer system 1 can cause the quantum computer 20 to bear some of the functions of the quantum autoencoder to extend processing executable by the quantum computer 20.

Second Embodiment

In a second embodiment, the description of things common to those in the first embodiment is omitted, and only different points will be described.

In the first embodiment, it is described that the input data is image data having the size of 3×3 pixels. In the second embodiment, image data having a size larger than the input data according to the first embodiment is treated as input data.

Figure 9:
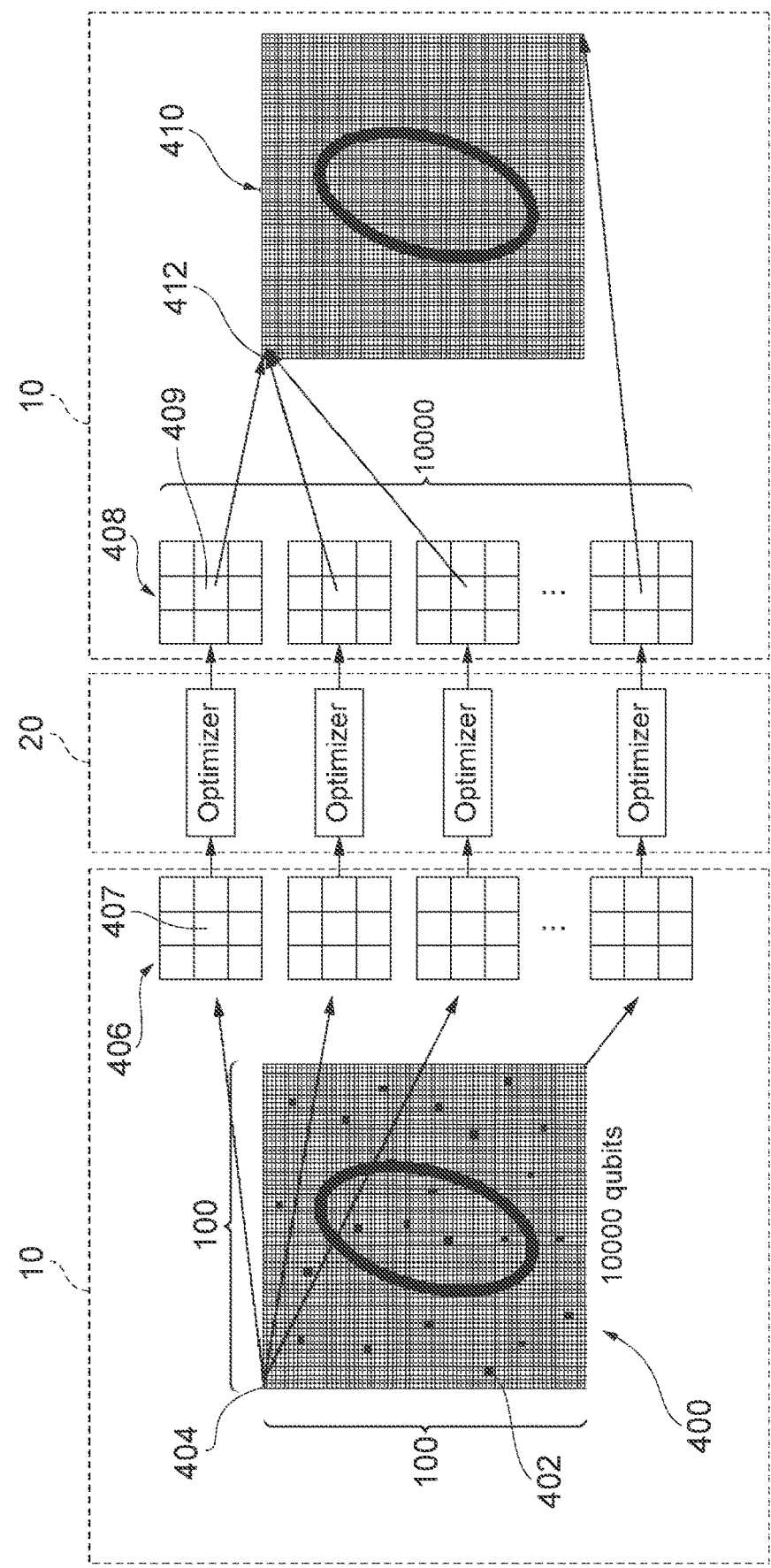
FIG. 9 is a diagram for describing processing by a computer system according to a second embodiment.

FIG. 9 is a diagram for describing processing by a computer system according to the second embodiment. It is assumed that the classical computer 10 stores, as input data 400, image data obtained by mapping 100×100 (=10000) pixels (first pixels). The input data 400 contains pixels representing letter "0," noise pixels 402, and remaining white pixels.

The classical computer 10 extracts, from the input data 400, a pixel group (first pixel group) corresponding to each of 10000 pixels that configure the input data 400. Here, the pixel group is image data having the size of 3×3 pixels (=9 pixels). Further, the center pixel contained in the pixel group is a corresponding pixel contained in the input data 400. Further, the remaining 8 pixels contained in the pixel group are 8 pixels around the corresponding pixel contained in the input data 400. For example, a pixel group 406 illustrated at the top corresponds to a pixel 404 located at the top left corner of the input data 400. A center pixel 407 of the pixel group 406 corresponds to the pixel 404. Note that the extraction of each pixel group may also be carried out by the extraction unit 122 included in the classical computer 10.

The quantum computer 20 performs adiabatic quantum computation based on each of the extracted 10000 pixel groups. Here, the quantum computer 20 may perform the adiabatic quantum computation using the learned coupling coefficient $Wij(\theta)$ generated with reference to FIG. 6, or may perform the adiabatic quantum computation using a coupling coefficient Wij(θ) set based on noiseless image data. Therefore, output data becomes data obtained by restoring data with noise removed from the corresponding pixel group 406.

Further, the quantum computer 20 outputs, as output data, 10000 pieces of image data (second pixel group) of 3×3 (=9) pixels (second pixels) as the execution results of the adiabatic quantum computation. For example, an output data 408 illustrated at the top is the execution result of the adiabatic quantum computation based on the pixel group 406.

As described above, the adiabatic quantum computation is executed on the assumption that each pixel contained in each pixel group is coupled with pixels adjacent to the up, down, left, and right sides of the pixel. Among 9 pixels contained in the pixel group, only the center pixel is coupled with the same pixel as the pixel contained in the input data. For this reason, the center pixel among the pixels contained in the output data is considered to best restore image data without noise. Note that the center pixel has more adjacent pixels than the other 8 pixels.

The classical computer 10 synthesizes 10000 pieces of output data output by the quantum computer 20 to generate image data with noise removed. Specifically, the classical computer 10 maps, into two dimensions, the center pixel contained in each of the 10000 pieces of output data to generate a synthesized image 410. Therefore, each of pixels contained in the synthesized image 410 becomes the center pixel contained in corresponding output data, respectively. For example, a top left pixel 412 contained in the synthesized image 410 corresponds to a center pixel 409 of output data 408. Here, processing for synthesizing output data to generate the synthesized image 410 is carried out by the synthesis unit 128 included in the classical computer 10.

Referring to a flowchart illustrated in FIG. 10, a flow of processing until the computer system 1 generates a synthesized image without noise based on input data containing noise will be described in more detail.

First, the acquisition unit 121 of the classical computer 10 acquires input data (step S301). It is assumed that the input data has a size larger than the size of 3×3 pixels. Specifically, the size of the input data is a size of 4×4 pixels (=16 pixels). It is also assumed that the input data contains noise.

Next, the extraction unit 122 acquires multiple pixel groups from the input data acquired in step S301 (step S303). Specifically, the extraction unit 122 extracts, from the input data, a number of pixel groups according to the number of pixels contained in the input data. More specifically, the extraction unit 122 extracts 16 pixel groups each of which corresponds to each of 16 pixels, respectively. Further, the size of each of the extracted pixel groups is the size of 3×3 pixels.

Next, the generation unit 124 generates a longitudinal magnetic field coefficient hz(θ) for each of the 16 pixel groups extracted in step S303 (step S305).

Next, the communication unit 130 sends the quantum computer 20 the longitudinal magnetic field coefficient hz(θ) and the learned coupling coefficient Wij(θ) corresponding to each of the 16 pixel groups extracted in step S303, respectively (step S307). The communication unit 240 of the quantum computer 20 receives and transfers the longitudinal magnetic field coefficient hz(θ) and the learned coupling coefficient Wij(θ) to the control unit 220. Here, it is assumed that the learned coupling coefficient Wij(θ) is prestored in the storage unit 110 to restore the pixel group extracted from input data without noise.

Next, the control unit 220 causes the quantum unit 230 to execute the adiabatic quantum computation algorithm on each of the 16 pixel groups based on the longitudinal magnetic field coefficient hz(θ) and the learned coupling coefficient Wij(θ) (step S309). Thus, the execution result of the adiabatic quantum computation for each of the 16 pixel groups is output as output data from the quantum unit 230, respectively. Here, the output data is a pixel group having the size of 3×3 pixels.

Next, the communication unit 240 sends the classical computer 10 the output data corresponding to each of the 16 pixel groups, respectively (step S311). The communication unit 130 of the classical computer 10 receives the output data respectively corresponding to each of the 16 pixel groups, and transfers the output data to the synthesis unit 128.

The synthesis unit 128 synthesizes the output data respectively corresponding to each of the 16 pixel groups to generate a synthesized image (step S313). Specifically, the synthesis unit 128 maps each center pixel contained in the output data into a two-dimensional grid pattern to generate the synthesized image. Thus, the synthesized image with noise removed from the input data can be obtained.

Figure 10:
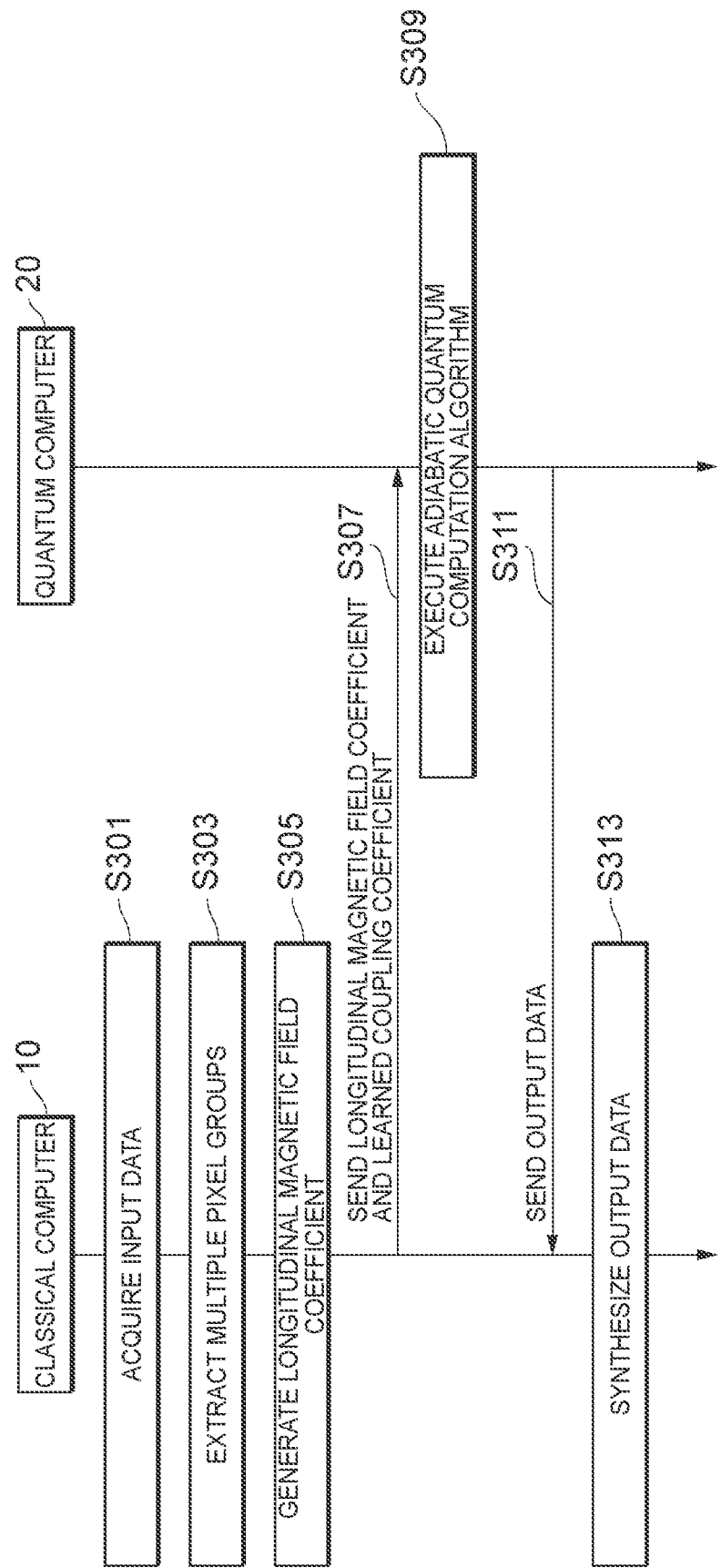
FIG. 10 is a flowchart illustrating a flow of processing until the computer system generates a synthesized image without noise based on input data containing noise.
Figure 11:
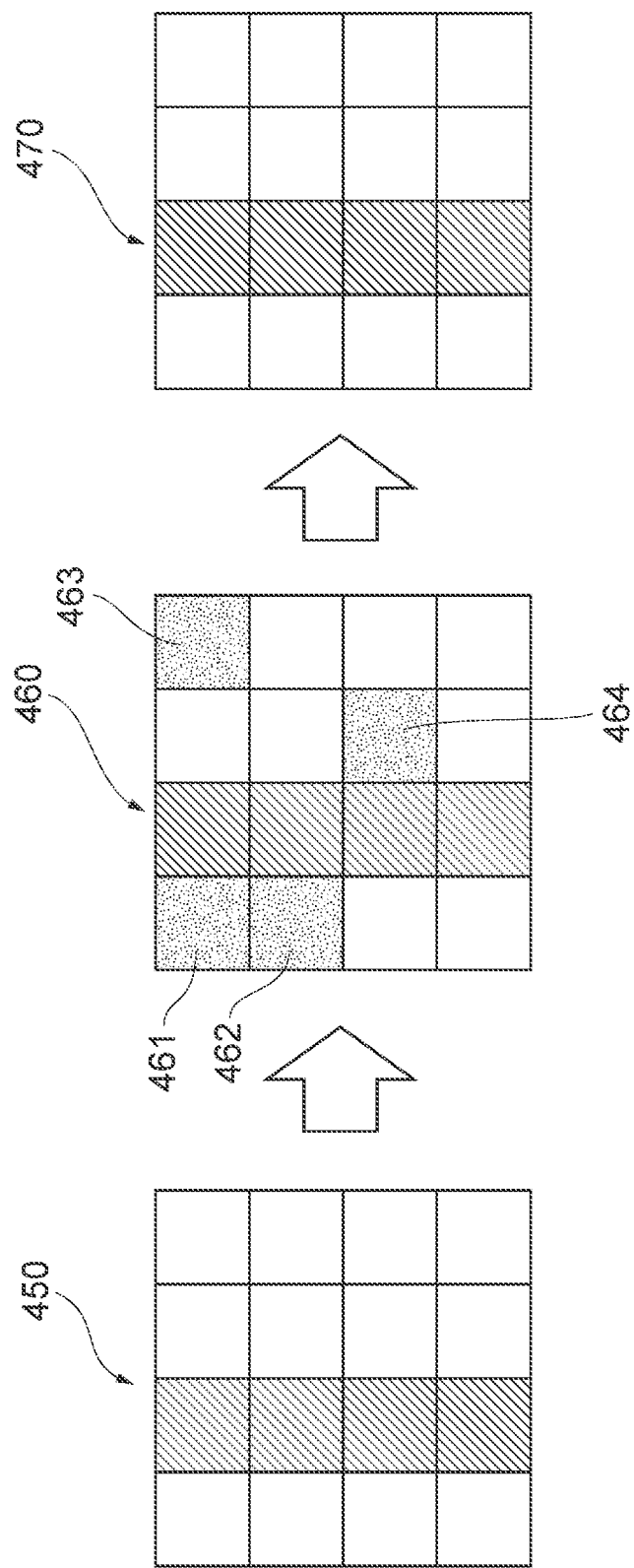
FIG. 11 is a diagram for describing the results of simulating the processing illustrated in FIG. 10 by the quantum simulator using image data of 4×4 pixels.

The processing illustrated in FIG. 10 was simulated by the quantum simulator using image data of 4×4 pixels. Referring to FIG. 11, simulation results will be described. In FIG. 11, an image data 450 without noise, an input data 460 with noise added thereto, and a synthesized image 470 that is restored are illustrated from left to right.

The image data 450 has the size of 4×4 pixels. Among pixels contained in the image data 450, pixels (pixels with diagonal hatched lines) in the second row from the left are all black (pixel value 1), and the remaining pixels are all white (pixel value 0). The input data 460 is data obtained by adding 30% of noise to the image data 450. Specifically, four noise pixels 461, 462, 463, and 464 (dot meshed pixels) are added to the input data 460. These pixels 461, 462, 463, and 464 are all black. When noise is removed from the input data 460 by the processing described with reference to FIG. 10, the synthesized image 470 is obtained.

Figure 12:
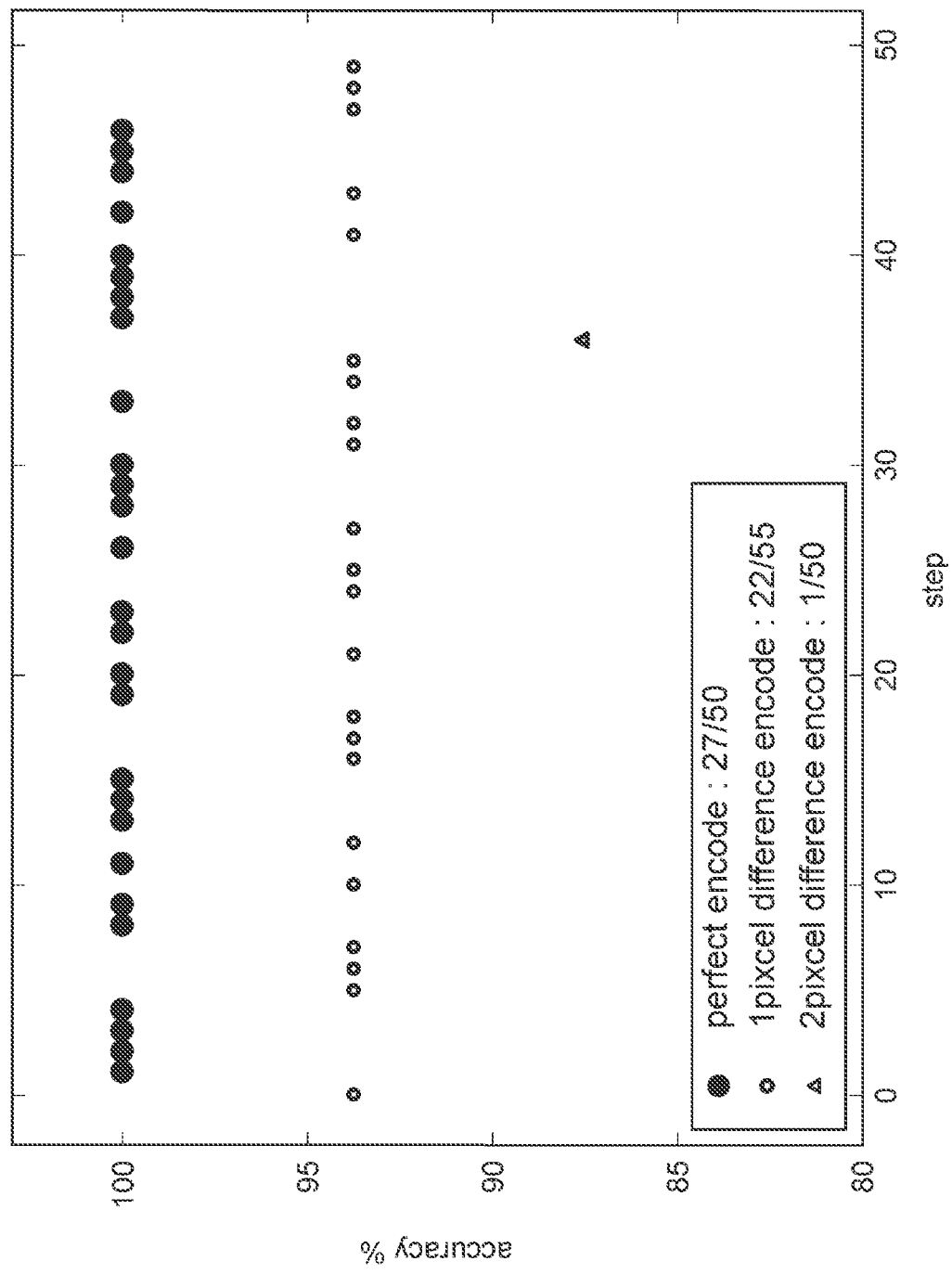
FIG. 12 is a chart illustrating the results of performing a simulation by the quantum simulator to remove noise 50 times by the processing described with reference to FIG. 9 to FIG. 11.

FIG. 12 is a chart illustrating the results of performing a simulation by the quantum simulator to remove noise from the input data 460 50 times by the processing described with reference to FIG. 9 to FIG. 11.

As illustrated in FIG. 12, among 50 times of the processing, the noise was able to be completely removed from the input data 27 processing times. When the noise rate is 30%, the noise was able to be completely removed from the input data at a rate of 54%. Further, the noise of 3 pixels among 4 noise pixels was able to be removed 22 processing times. According to the present embodiment, it can be said that the noise could be removed at a rate of 98% if 1 noise pixel is allowed.

Subsequently, such a simulation that image data of number "0" in one MNIST having a size of 28×28 pixels (=784 pixels) is restored by using the quantum simulator to generate a synthesized image was performed. Note that processing for generating the synthesized image here is substantially identical to the processing described with reference to FIG. 9 to FIG. 11.

Figure 13:
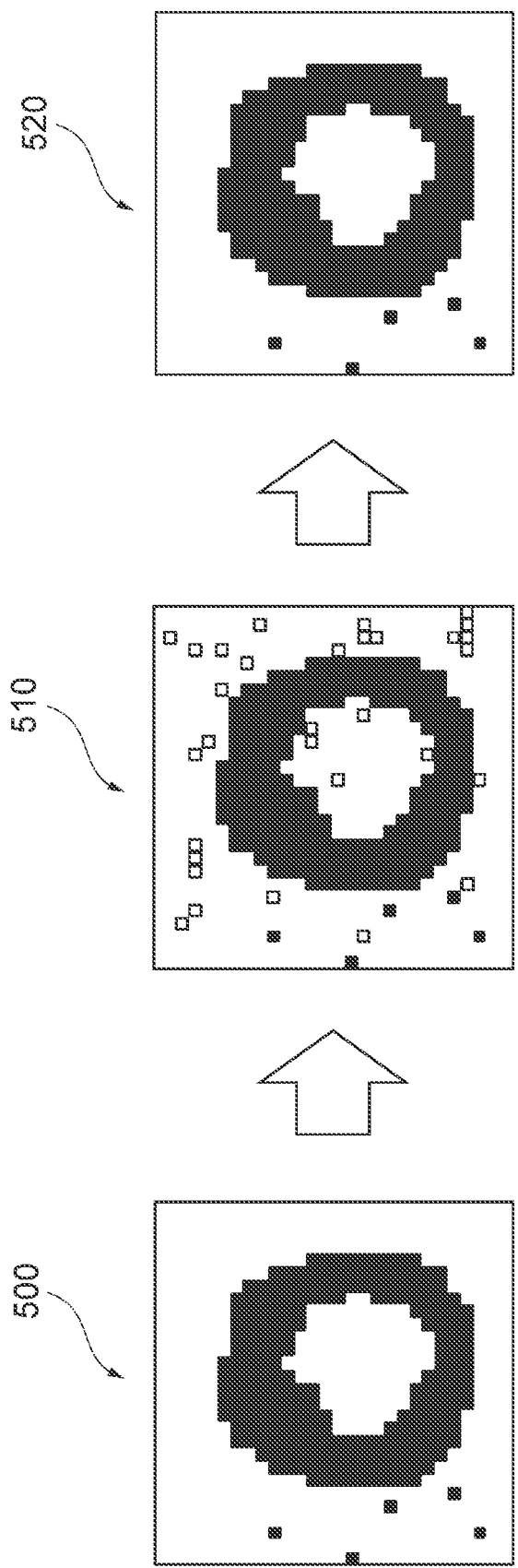
FIG. 13 is a diagram illustrating the results of performing such a simulation that image data of number "0" in one MNIST having a size of 28×28 pixels is restored by using the quantum simulator to generate a synthesized image.

In FIG. 13, an image data 500 without noise, an input data 510 containing noise, and a synthesized image 520 based on the input data 510 are illustrated from left to right. As illustrated in FIG. 13, it is found that the synthesized image 520 is exactly the same as the image data 500 without noise. Thus, even when 784 qubits are required to make all the pixels contained in the image data 500 correspond to qubits, image data can be restored by 9 qubits by the computer system according to the present embodiment.

Further, it took about 8.4 seconds and about 395 seconds for the above-described simulations of removing noise from input data of 4×4 pixels and input data of 28×28 pixels, respectively. On the other hand, if qubits having a size of 4×4 pixels and qubits having a size of 28×28 pixels can be prepared, it will be inferred that it takes about 54 seconds and about 10 to the 23rd power years to execute the above-described processing of the quantum autoencoder, respectively. Therefore, it is inferred that the processing time can be significantly reduced by executing the processing according to the present embodiment.

The computer system according to the second embodiment is described above. The computer system according to the present embodiment can process data having a size larger than the number of available qubits (for example, 16 pixels or 784 pixels described above). The computer system according to the present embodiment has the same function as a convolutional autoencoder in machine learning. Specifically, the pixel group of 3×3 pixels described above is regarded as a filter to perform quantum computation on all the pixels of input data using this filter in order to obtain a synthesized image by synthesizing the computation results. Therefore, the computer system according to the present embodiment functions as a so-called convolutional quantum autoencoder. As a result, the computer system 1 can make the quantum computer 20 bear some of the functions of the convolutional quantum autoencoder, that is, the computer system 1 can extend processing executable by the quantum computer 20.

Further, the computer system according to the present embodiment can compress input data into lower-dimensional data. As described above, the coupling coefficients Wij(θ) between each of the pixels contained in the input data and respective pixels adjacent to the up, down, left, and right sides of the pixel are learned, respectively. The input data can be compressed into two-dimensional data by taking out the coupling coefficient Wi, j+1(θ) with the right pixel and Wi+1, j(θ) and the coupling coefficient Wi+1, j(θ) with the down pixel among the learned coupling coefficients Wij(θ). Note that the combination of taken-out coupling coefficients is not limited thereto. For example, the coupling coefficient with the up pixel and the coupling coefficient with the down pixel may be taken out, or any other combination of coupling coefficients may be taken out.

Figure 14:
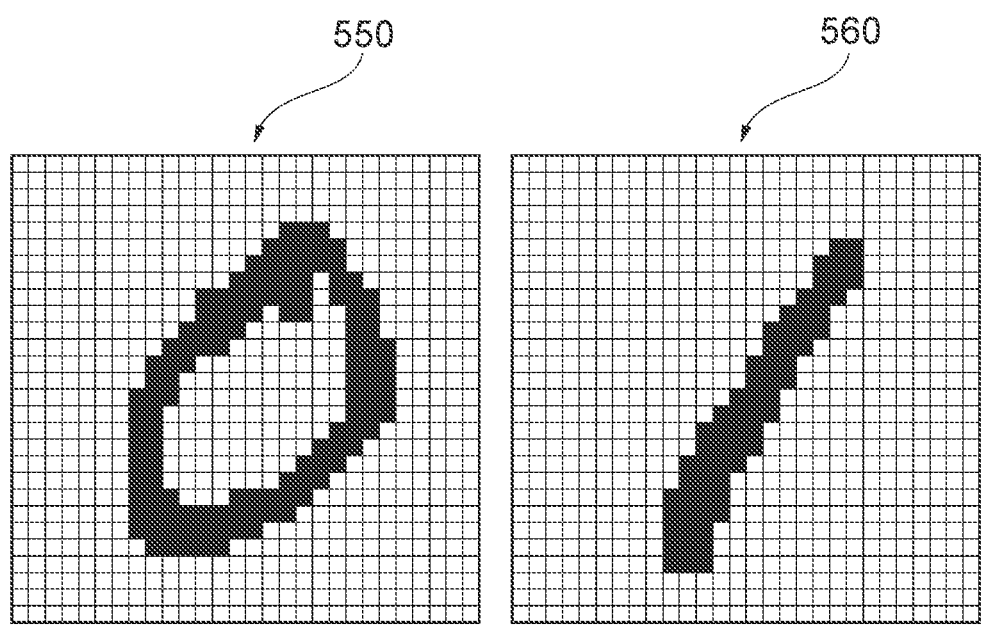
FIG. 14 is a diagram illustrating an MNIST image of "0" and an MNIST image of "1."

In the present embodiment, two types of image data, that is, image data of "0" and image data of "1," were compressed into two-dimensional data 30 times, respectively. Note that both image data are MNIST images. In FIG. 14, image data 550 of "0" and image data 560 of "1" before being compressed are illustrated.

Figure 15:
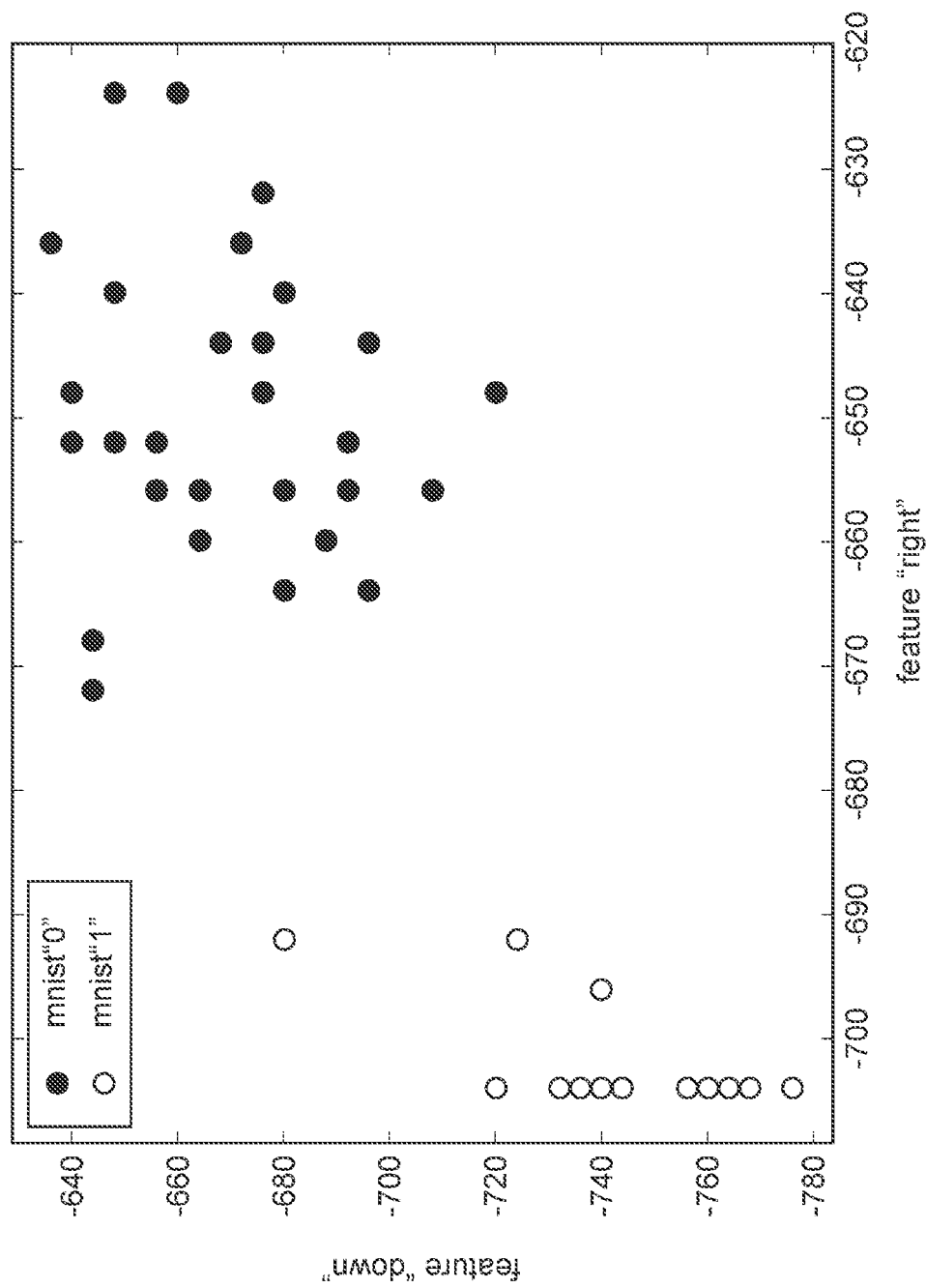
FIG. 15 is a chart illustrating the results of plotting two-dimensional data obtained by compressing respective images of the MNIST image of "0" and the MNIST image of "1."

FIG. 15 is a chart illustrating the results of plotting two-dimensional data obtained by compressing input data of respective images. The horizontal axis represents the coupling coefficient Wi, j+1(θ) with the right pixel, and the vertical axis represents Wi+1, j(θ) with the down pixel. Filled circles are plots corresponding to the MNIST image of "0" and open circles are plots corresponding to the MNIST image of "1." As illustrated in FIG. 15, it is found from the two-dimensional data obtained by compressing the image data that the two types of image data are classified well.

Hardware Configuration

Figure 16:
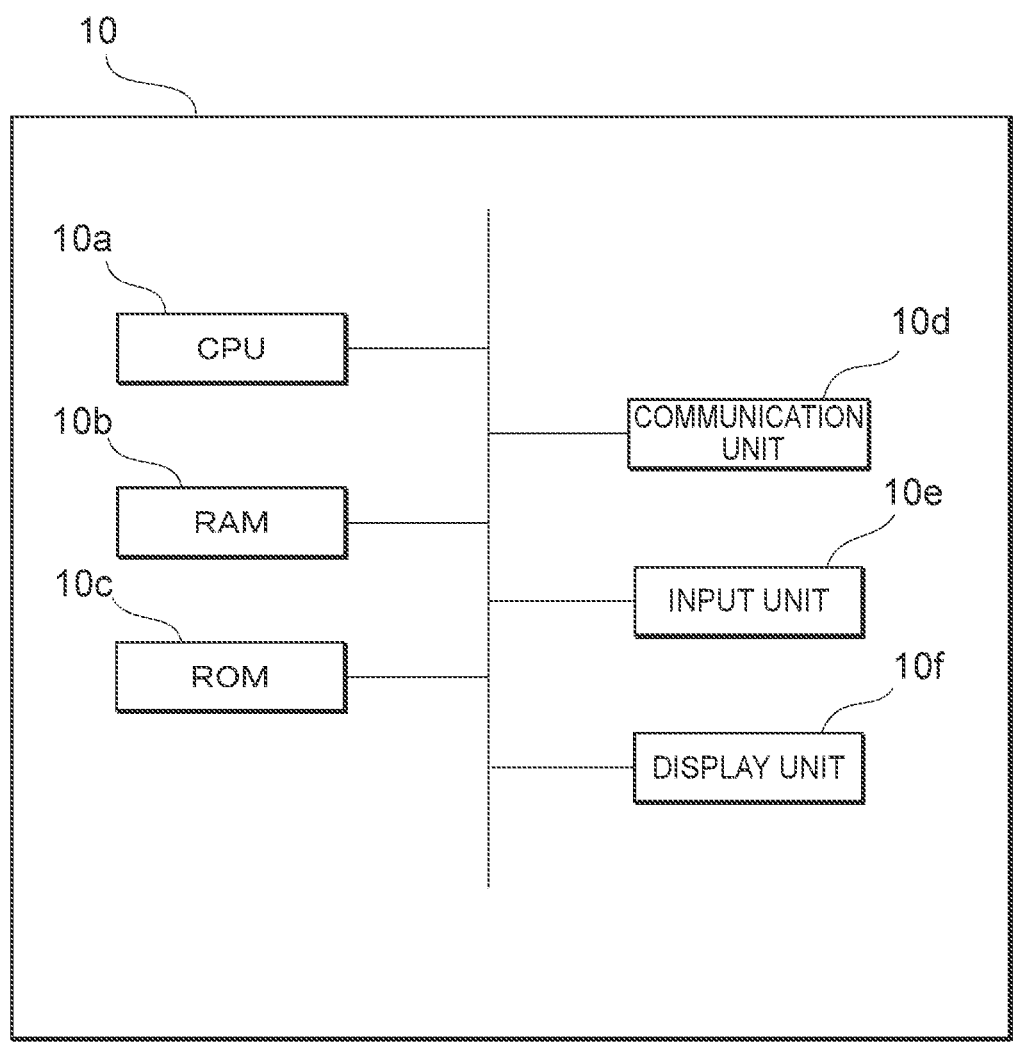
FIG. 16 is a diagram illustrating an example of the hardware configuration of the classical computer according to the present embodiment.

FIG. 16 is a diagram illustrating an example of the hardware configuration of the classical computer 10 according to the present embodiment. The classical computer 10 has a CPU (Central Processing Unit) 10a corresponding to an arithmetic unit, a RAM (Random Access Memory) 10b corresponding to the storage unit 110, a ROM (Read only Memory) 10c corresponding to the storage unit 110, a communication unit 10d, an input unit 10e, and a display unit 10f. These components are connected to one another in such a manner that data can be sent and received through a bus. In this example, a case where the classical computer 10 is configured as one computer will be described, but the classical computer 10 may be realized by combining two or more computers. Further, the configuration illustrated in FIG. 16 is just one example. The classical computer 10 may have any other component, or may not have any of these components. Here, the arithmetic unit includes the processing unit 120.

The CPU 10a is a control unit which performs control related to the execution of a program stored in the RAM 10b or the ROM 10c, and performs arithmetic operations and processing on data. The CPU 10a receives various data from the input unit 10e and the communication unit 10d, and displays, on the display unit 10f, and stores, in the RAM 10b, the results of the arithmetic data operations.

The RAM 10b is data rewritable in the storage unit, which may be composed, for example, of semiconductor memory elements. The RAM 10b may store the program executed by the CPU 10a and data such as image data. Note that these are just illustrative examples, and any other data may be stored or some of these pieces of data may not be stored in the RAM 10b.

The ROM 10c is data readable in the storage unit, which may be composed, for example, of semiconductor memory elements. The ROM 10c may store data, for example, which is not rewritten.

The communication unit 10d is an interface which connects the classical computer 10 to other devices. The communication unit 10d may be connected to a communication network such as the Internet.

The input unit 10e accepts data input from a user, which may include a keyboard and a touch panel, for example.

The display unit 10f displays the arithmetic operation results by the CPU 10a, which may be configured, for example, by an LCD (Liquid Crystal Display). The display unit 10f may display changes in in-stock quantities of plural goods or changes in warehouse capacity.

The program may be provided in a form of being stored on a computer readable storage medium, such as the RAM 10b or the ROM 10c, or provided through the communication network connected by the communication unit 10d. In the classical computer 10, the CPU 10a executes the program to achieve various operations described with reference to FIG. 1. Note that these physical components are just illustrative examples, which may not be necessarily independent components. For example, the classical computer 10 may include an LSI (Large-Scale Integration) on which the CPU 10a and the RAM 10b or the ROM 10c are integrated.

Further, the quantum computer 20 may include the CPU 10a, the RAM 10b, the ROM 10c corresponding to the storage unit 110, communication unit 10d, the input unit 10e, and the display unit 10f as described with reference to FIG. 16.

Supplements

The above-described embodiments are to make it easier to understand the present invention, and are not intended to limit the interpretation of the present invention. The respective elements included in the embodiments, and the arrangement, materials, conditions, shapes, and sizes thereof are not limited to those illustrated, and changes can be made appropriately. Further, the configurations illustrated in different embodiments can be partially replaced or combined.

The process of each step described with reference to each flowchart may be executed in chronological order as described in this specification, or the process of each step may be executed in order different from the above-described order unless there is a contradiction. Further, the process of each step may be carried out in series, or processes of two or more steps may be executed in parallel.

In the aforementioned embodiments, the computer system 1 is described to perform various processing based on image data, such as updating of parameters or removal of noise by quantum computation. However, the processing target by the computer system 1 is not limited to image data.

Further, the processing described with reference to FIG. 9 and the like in the above embodiment is so described that the extracted pixel group has the size of 3×3 pixels. However, the size of the extracted pixel group is not limited thereto. For example, the extracted pixel group may have a size of 4×4 pixels or a size of 5×5 pixels.

Further, in the second embodiment mentioned above, the description is made on the assumption that as many pixel groups as the number of pixels of the input data are extracted to execute adiabatic quantum computation. However, the present invention is not limited thereto, and the computer system may extract multiple pixel groups smaller or larger in number than the number of pixels of the input data to perform adiabatic quantum computation on respective pixel groups in order to generate a synthesized image.

Further, in the aforementioned embodiments, the description is made on the assumption that the classical computer 10 and the quantum computer 20 collaborate with each other to achieve the classical computer functions. However, the present invention is not limited thereto, and the classical computer functions may be achieved by the classical computer 10 alone. Specifically, in addition to the storage unit 110, the processing unit 120, and the communication unit 130 described above, the classical computer (information processing device) may further include the control unit 220 that controls the quantum unit 230 included in the quantum computer 20.

In this case, the control unit included in the classical computer 10 may acquire information (for example, quantum computation parameters and the like) for controlling the quantum unit 230 from the storage unit 110 and the processing unit 120. Further, the control unit may generate a control signal for controlling the quantum unit 230 based on the quantum computation parameters, and send the control signal to the quantum unit 230 to control the quantum unit 230.

REFERENCE SIGNS LIST

1 . . . computer system, 10 . . . classical computer, 20 . . . quantum computer, 30 . . . input data, 120 . . . processing unit, 122 . . . extraction unit, 124 . . . generation unit, 126 . . . update unit, 128 . . . synthesis unit, 220 . . . control unit, 230 . . . quantum unit, 240 . . . communication unit, 300 . . . input data, 310 . . . output data, 320, 322, 324, 326, 328 . . . pixel, 330 . . . quantum unit, 350 . . . quantum circuit, 360 . . . input data, 370 . . . output data, 400 . . . input data, 402, 404, 407, 409, 412 . . . pixel, 406 . . . pixel group, 408 . . . output data, 410 . . . synthesized image.

What is claimed is:

1. A computer system comprising:
a classical computer capable of executing a classical program; and
a quantum computer capable of executing a quantum program, wherein
the classical computer includes an extraction unit, a generation unit, and a synthesis unit,
the quantum computer includes a control unit and a quantum unit,
the extraction unit extracts a plurality of first element groups as a set of first elements from input data obtained by mapping a plurality of first elements associated with element values, respectively,
the generation unit generates, for each of the plurality of first element groups, parameters based on a first element contained in a corresponding first element group,
the control unit controls the quantum unit to cause the quantum unit to execute a quantum computation algorithm on each of the plurality of first element groups based on the parameters and corresponding feature data, and
the synthesis unit synthesizes execution results of the quantum computation algorithm by the quantum unit for each of the plurality of first element groups.

2. The computer system according to claim 1, wherein
the extraction unit extracts a first element group containing a corresponding first element based on each of the plurality of first elements contained in the input data,
the execution results of the quantum computation algorithm are second element groups each of which contains a second element according to the corresponding first element, and
the synthesis unit maps the second element contained in each of the second element groups.

3. The computer system according to claim 2, wherein the second element has more adjacent elements than the other elements contained in the second element group.

4. An information processing method by a processor of a computer system including a classical computer capable of executing a classical program and a quantum computer capable of executing a quantum program, the information processing method causing the processor to execute the steps of:
extracting a plurality of first element groups as a set of first elements from input data obtained by mapping a plurality of first elements associated with element values, respectively;
generating, for each of the plurality of first element groups, parameters based on a first element contained in a corresponding first element group;
controlling a quantum unit included in the quantum computer to cause the quantum unit to execute a quantum computation algorithm on each of the plurality of first element groups based on the parameters and corresponding feature data; and
synthesizing execution results of the quantum computation algorithm by the quantum unit for each of the plurality of first element groups.

5. A non-transitory computer readable medium storing a program executed by a computer system including a classical computer capable of executing a classical program and a quantum computer capable of executing a quantum program, the program causing the computer system to implement:

a function to extract a plurality of first element groups as a set of first elements from input data obtained by mapping a plurality of first elements associated with element values, respectively;

a function to generate, for each of the plurality of first element groups, parameters based on a first element contained in a corresponding first element group;

a function to control a quantum unit included in the quantum computer to cause the quantum unit to execute a quantum computation algorithm on each of the plurality of first element groups based on the parameters and corresponding feature data; and a function to synthesize execution results of the quantum computation algorithm by the quantum unit for each of the plurality of first element groups.

6. An information processing device comprising:

an extraction unit which extracts a plurality of first element groups as a set of first elements from input data obtained by mapping a plurality of first elements associated with element values, respectively;

a generation unit which generates, for each of the plurality of first element groups, parameters based on a first element contained in a corresponding first element group;

a control unit which controls a quantum computer to cause the quantum computer to execute a quantum computation algorithm on each of the plurality of first element groups based on the parameters and corresponding feature data; and a synthesis unit which synthesizes execution results of the quantum computation algorithm by the quantum computer for each of the plurality of first element groups.

* * * * *